United States Patent [19]

Lassiaz

[11] Patent Number: 4,629,049
[45] Date of Patent: Dec. 16, 1986

[54] SUSTAINED SELF-CENTERING CLUTCH RELEASE BEARING FOR MOTOR VEHICLES

[75] Inventor: Philippe Lassiaz, Boulogne, France

[73] Assignee: Valeo, Paris, France

[21] Appl. No.: 519,199

[22] Filed: Aug. 1, 1983

[30] Foreign Application Priority Data

Aug. 3, 1982 [FR] France ............................... 82 13557

[51] Int. Cl.⁴ ............................................. F16D 23/14
[52] U.S. Cl. .................... 192/98; 192/110 B; 384/592
[58] Field of Search ............................ 192/98, 110 B; 308/89 B; 384/615, 592

[56] References Cited

U.S. PATENT DOCUMENTS

| 4,099,605 | 7/1978 | Ernst et al. | 192/98 |
| 4,144,957 | 3/1979 | de Gennes | 192/98 |
| 4,186,828 | 2/1980 | Renaud | 192/98 |
| 4,428,472 | 1/1984 | Olschewski et al. | 192/110 B |

FOREIGN PATENT DOCUMENTS

| 2052001 | 1/1981 | United Kingdom | 192/98 |
| 2058271 | 4/1981 | United Kingdom | 192/98 |
| 2073353 | 10/1981 | United Kingdom | 192/98 |

Primary Examiner—Rodney H. Bonck
Assistant Examiner—Alan G. Towner
Attorney, Agent, or Firm—Charles E. Brown; Charles A. Brown

[57] ABSTRACT

A self-centering clutch release bearing for sustained alignment is disclosed comprising an operating member having a transverse flange, an annular bearing plate bearing axially against the flange and cooperating with a throw-out fork, a drive member (e.g. a ball bearing) coacting with clutch release members (e.g. diaphragm spring fingers) mounted for limited radial movement relative to the operating member. Resilient portions alternate with bearing portions on the bearing plate and axial tabs extend from the resilient portions for coupling the drive member to the operating member, the resilient portions biasing the drive member toward a flange on the operating member.

9 Claims, 7 Drawing Figures

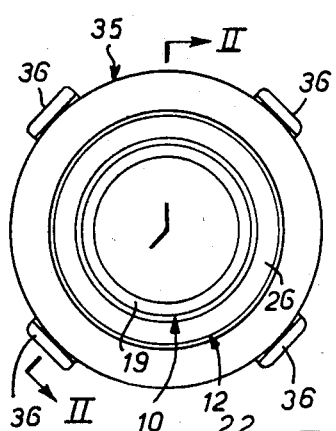
FIG. 1
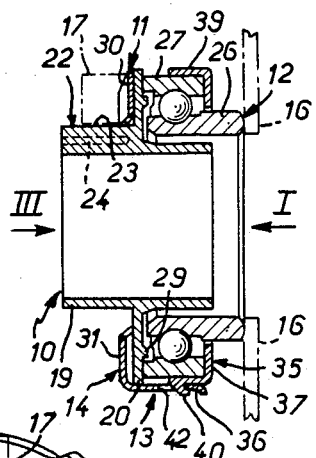
FIG. 2
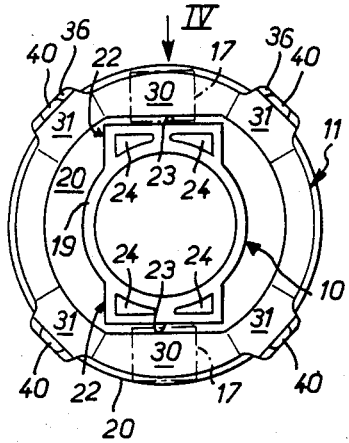
FIG. 3
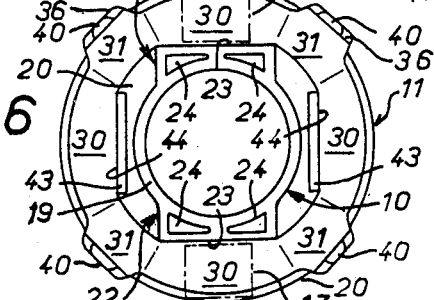
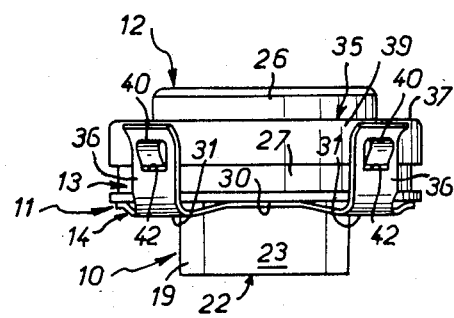
FIG. 4
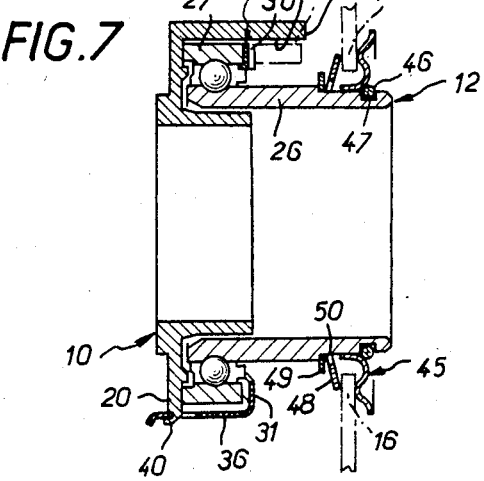
FIG. 6
FIG. 7
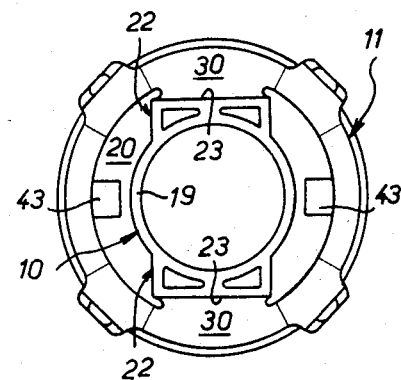
FIG. 5

SUSTAINED SELF-CENTERING CLUTCH RELEASE BEARING FOR MOTOR VEHICLES

BACKGROUND OF THE INVENTION

The present invention relates generally to self-centering clutch release bearings for sustained alignment which keep their self-centered position once it is obtained.

Such self-centering release bearings which are employed notably in motor vehicles generally comprise an operating member which is cooperable with an actuating member which in practice is a throw-out or clutch fork, a drive member which is adapted to coact with clutch release members which in practice are usually diaphragm spring fingers.

The drive member is mounted for limited transverse movement in all directions relative to the operating member. Coupling means in association with axially acting resilient means secures the drive member axially to the operating member The clutch release bearing may be a push-type which in disengagement operation pushes against the release members of the clutch or a pull-type which in disengagement operation pulls against the release members of the clutch.

In any event, if there is misalignment between the axes of the clutch and the support for the clutch release bearing the drive member aligns or centers itself with respect to the axis of the clutch during clutch disengagement and for this reason as the axially acting resilient means operative between the drive member and the operating member the drive member thereafter maintains its self-centered position with respect to the operating member.

The present invention relates more particularly to clutch release bearings wherein the actuating member comes into action with the operating member through a generally annular bearing plate which bears either directly against the operating member in the case of push-type clutch release bearing or indirectly, for example, through the drive member, in the case of pull-type clutch release bearings.

DESCRIPTION OF THE PRIOR ART

Such an annular bearing plate is employed notably in a pull-type clutch release bearing disclosed in U.S Pat. No. 4,186,828 assigned to the assignee of the instant application. The annular bearing plate receives the axial force exerted by the actuating member during disengagement operation and therefore spares the operating member accordingly, avoiding wear of the corresponding part of the operating member, particularly when the operating member is made of plastic or cast iron. The annular bearing plate is therefore typically made of suitably treated steel to provide the desired wear resistance.

It has also been proposed, as in the case of the aforementioned U.S. patent, to provide the axially acting resilient means in the configuration of a spring washer between the operating member and the drive member for maintaining the self-centered position of the drive member once attained.

In this U.S. patent the metal spring washer which is circumferentially undulated or corrugated is arranged at the front of the clutch release bearing, i.e., to the drive member side thereof, is adapted to coact with the release members of the clutch. The spring washer has at its outer periphery and integral therewith axially extending tabs which are part of the coupling means for axially securing the drive member to the operating member. The annular bearing plate is, in addition, disposed at the rear of the clutch release bearing in contact with a flange of the operating member against the other side of which bears the drive member. The axial tabs are in engagement with projecting lugs or hooks provided on the annular bearing plate, and more particularly on an axial rim thereof embracing the flange of the operating member.

Such arrangements have given satisfaction, but they have drawbacks. First of all, to have the requisite resilient characteristics the spring washer must in practice be made of spring steel. Thus, in a relatively costly fashion two parts of treated steel, i.e., the spring washer and the annular bearing plate, are utilized.

Further, the undulations or corrugations of the spring washer necessarily protrude axially in practice. These undulations protrude axially from the front end of the outer race of the ball bearing the drive member conventionally comprises, the inner race being adapted to coact with the release members of the clutch. These undulations are liable to accidentally interfere with the release members when the inner race of the clutch release bearing is at an angle to the axis of the assembly. To avoid such interference in practice, the axial length of the inner race of the bearing must be increased, to the detriment of the axial dimension and the weight of the clutch release bearing as well as to the detriment of the inertia of the rotating part of the clutch release bearing.

Moreover, if, in operation, during clutch disengagement, the release members of the clutch happen to come into frictional contact with the spring washer, it is all the more damaging to the structural integrity of the clutch release bearing as the spring washer has a discontinuous outer periphery comprising axial tabs integral therewith. Rapid damage to the spring washer may result and, with it, damage to the clutch release bearing and/or the release members of the clutch.

Furthermore, since the annular bearing plate is made of treated steel, and in practice, relatively thick, it is difficult, without costly complications, to make the axial rim of the annular bearing plate, on which the hooks for the associated coupling means are provided, of substantial length. It follows that the axial tabs of the coupling means are always relatively axially long. When the axial tabs are integral with the spring washer there are substantial scraps of the heat treated steel blank from which the spring washer component is cut before it is shaped.

Finally, the shaping of the lugs or hooks on the annular bearing plate for engagement with the axial tabs is often difficult notably when the annular bearing plate is relatively thick.

A general object of the present invention is to provide an arrangement which avoids the foregoing drawbacks and thereby results in a not insubstantial reduction in cost, a reduction in weight and axial length of a self-centering clutch release bearing for sustained alignment.

SUMMARY OF THE INVENTION

According to the invention there is provided a self-centering clutch release bearing for sustained alignment and use on a motor vehicle, of the type comprising an operating member which is adapted to cooperate with an actuating member (in practice a fork) through a generally annular bearing plate against which it axially bears, directly or indirectly, a drive member adapted to coact with the release members of a clutch and mounted for limited transverse movement in all directions relative to the operating member. Coupling means secures the drive member axially to the operating member in cooperation with axially acting resilient means. The present clutch release bearing is characterized by the axially acting resilient means being integral with the annular bearing plate.

Thus, according to the invention, one and the same part provides a dual function: that of the annular bearing plate and of the axially acting resilient means for obtaining and maintaining the centered position of the drive member. Thus a single part needs to be treated. In other words, compared with other known sustained self-centering release bearings, a second treated steel part can be eliminated, heretofore necessary for providing the second function.

When the clutch release bearing is of the push-type and the bearing plate is necessarily disposed at the rear of the clutch release bearing, the axially acting resilient means advantageously is also disposed at the rear. The resilient means does not therefore increase the forward axial length of the release bearing.

Further, to provide the coupling means for securing the drive member axially to the operating member it suffices to provide a simple cap partially covering the outer race of the antifriction bearing of the drive member.

Besides, the axial length of the cap being advantageously reduced, as the cap is operative radially, it provides for accidental frictional contact with the release members of the associated clutch an advantageously circularly continuous contour which is a less rapid potential source of damage to either part involved. Moreover, such a cap may easily be made of synthetic plastic material if desired. Whereupon the axial length of the cap can be relatively elongate correspondingly reducing the length of the axial tabs of the coupling means and lugs or hooks may be provided for engagement with the axial tabs.

It is known, to be sure, to provide at the rear of a push-type clutch release bearing, axially acting resilient means which are operative between the drive member and the operating member thereof. Such an arrangement is disclosed in U.S. Pat. No. 4,029,186 assigned to the assignee of the present application.

But in this patent the axially acting resilient means comprises a Belleville type cone spring which is incapable for insuring at the same time the function of the annular bearing plate which cooperates with the actuating member. On the contrary, in this patent, this function is fulfilled by the flange of the operating member which is itself made of suitably treated metal and against which bears the cone spring defining the axially acting resilient means.

Such is not the case with the present invention wherein, as mentioned above, a single part advantageously insures the dual function of the bearing plate and the axially acting resilient means.

These and other features and advantages of the invention will be brought out in the description which follows, given by way of example, with reference to the accompanying drawings.

BRIEF DESCRIPTION OF THE DRAWINGS

FIG. 1 is a plan view, taken in the direction of arrow I in FIG. 2, of a clutch release bearing according to the invention;

FIG. 2 is longitudinal cross-sectional view taken along broken line II—II in FIG. 1;

FIG. 3 is another plan view, taken in the direction of arrow III in FIG. 2;

FIG. 4 is an elevational view, taken in the direction of arrow IV in FIG. 3;

FIGS. 5 and 6 are views similar to that of FIG. 3 for two other embodiments; and FIG. 7 is a view similar to that of FIG. 2 for yet another embodiment.

DESCRIPTION OF THE PREFERRED EMBODIMENTS

Generally, and as illustrated in the drawings, the clutch release bearing according to the invention is of the sustained self-centering variety, i.e., once its self-centered position is achieved it is maintained, and is intended to be employed with automotive clutches. Such a clutch release bearing generally comprises an operating member 10 which cooperates with an actuating member, in practice a clutch throw-out fork, through the medium of an annular bearing plate 11 bearing, directly or indirectly, axially against the operating member 10. The clutch release bearing further comprises a drive member 12 which is adapted to coact with the release members, in practice diaphragm fingers of the associated clutch and is mounted for limited transverse in all directions relative to the operating member 10. Coupling means 13 in association with axially acting resilient means 14 axially secures the drive member 12 to the operating member 10.

FIGS. 1–6 of the drawings illustrate push-type clutch release bearings which are adapted to push against the release members of the clutch to disengage the same.

In FIG. 2 the diaphragm fingers 16 which define the clutch release members are partially represented in chain-dotted lines. Likewise the end of one of the prongs or arms 17 of the clutch throw-out fork defining the actuating member is represented in chain-dotted lines in FIG. 2 and the ends of each of the arms 17 in FIG. 3.

In all the embodiments of FIGS. 1–6 the operating member 10 comprises an axial sleeve 19 which is adapted to be received on a support or guide member (e.g. fixed to the transmission housing) and an annular flange 20 which extends transversely or radially for cooperation with the drive member 12. In practice, as shown, the operating member 10 comprising the sleeve 19 and the annular flange 20 is one-piece molded plastic construction.

In the illustrated embodiments the sleeve 19 comprises two radially projecting external ribs 22 at diametrically opposite positions having plane surfaces parallel to each other for cooperation with the prongs or arms 17 of the throw-out fork for guiding the same and preventing the rotation of the clutch release bearing relative to the throw-out fork. Preferably, the ribs 22 are hollowed out at 24 to reduce the weight thereof.

In conjunction therewith, in the FIGS. 1–6 embodiment, the drive member 12 comprises a ball bearing having an inner race 26 which alone is adapted to come into contact with the clutch release members 16 and an outer race 27 which alone is adapted to bear axially against the front side of the flange 20 of the operating member 10, i.e., the side which faces the release members 16. The inner and outer races 26, 27 are suitably axially offset as is conventional.

For the limited transverse or radial movement of the drive member 12 relative to the operating member 10 which is necessary for the sought-after self-centering action there is provided an annular gap or clearance between the sleeve 19 of the operating member and the inner race 26 of the ball bearing. The sliding movement of the drive member 12 in all directions in contact with the flange 20 of the operating member 10 is limited by a bead 29 projecting from the flange 20, annularly around the axis of the clutch release bearing for cooperation with the inner surface of the outer race 27 of the roller bearing, and more particularly with a recess provided in this surface.

In the embodiments of FIGS. 1-6 the annular bearing plate 11 bears directly axially against the operating member 10, in contact with the rear side of the flange 20 of the operating member 10, i.e., the side facing away from the release members 16.

For cooperation with the actuating member the annular bearing plate 11 has at least one substantially planar bearing portion 30 and in practice two diametrically opposed, substantially planar bearing portions 30 since the actuating member comprises a throw-out fork with two prongs or arms 17 diametrically opposite each other The planar bearing portions 30 are in registration with the ribs 22 on the sleeve 19 of the operating member 10.

According to the invention the associated axially acting resilient means 14 is integral with the annular bearing plate 11. The resilient means 14 comprises at least one resilient portion circumferentially spaced from the planar bearing portions 30 of the annular bearing plate 11. In practice, the annular bearing plate 11 comprises at least two resilient portions 31 circumferentially alternating with the planar bearing portions 30. The annular bearing plate may of course have more than two circumferentially spaced resilient portions. And as will be brought out below, the annular bearing plate may likewise have more than two bearing portions 30.

In the embodiments of FIGS. 1-6, the annular bearing plate 11 comprised two resilient portions 31 at right angles to one another, two resilient portions 31 being located between each bearing portion 30.

Generally speaking, each resilient portion 31 comprises a local deformation of the annular bearing plate 11 protruding axially from the bearing portions 30.

In the embodiment of FIGS. 1-6 the deformation is generally a circularly elongated corrugation or undulation which extends the full radial extent of the annular bearing plate 11.

In any event, the resilient portions 31 of the annular bearing plate 11 are in engagement with the coupling means 13 axially securing the drive member 12 to the operating member 10.

In the embodiments of FIGS. 1-6 the coupling means 12 comprises an annular cap 35 and axial tabs 36 which are equal in number to the resilient portions 31 and attach the annular bearing plate 11 to the cap 35.

In the various embodiments the cap 35 comprises a radial or transverse wall 37 which bears axially against the end of the outer race 27 of the ball bearing of the drive member 16 facing away from the flange 20 of the operating member 10. The cap 35 also comprises an annular rim 39 which extends annularly around the outer race 27 of the ball bearing, preferably with some radial play. Lugs or hooks 40 at circumferentially spaced positions project radially outwardly from the rim 39 for engagement with the axial tabs 36.

In the embodiment of FIGS. 1-6 the axial tabs 36 are in one-piece construction with the resilient portions 31 of the annular bearing plate and extend from the outer periphery thereof.

In practice, at the junction of the resilient portions 31 to the axial tabs 36 the resilient portions 31 are preferably planar, as shown.

In any event each axial tab 36 has at its free end an opening 42 for receiving a corresponding lug or hook 40 on the cap 35. To facilitate the engagement the ends of the axial tabs 36 are curved and the lugs or hooks 40 are at an angle.

As will be readily appreciated the annular bearing plate 11 is preferably made of spring steel and the cap 35 may advantageously be made of synthetic plastic material.

In any case the resilience of the resilient portions 31 of the annular bearing plate 11 permits self-centering and axially maintains the position of the drive member 12 relative to the operating member after self-centering.

Preferably, the bearing portions 30 of the annular bearing plate 11 are radially wider than the main part of the annular bearing plate 11 for better seating of the prongs or arms 17 of the throw-out fork. These bearing portions 30 are therefore, in practice, in the illustrated embodiments, radially wider than the resilient portions 31.

In the embodiment of FIGS. 1-4 the inner edge portions of the annular bearing plate 11 in line with the bearing ribs 30 are rectilinear for increasing the width of the annular bearing plate 11 thereat. The planar sides 23 of the ribs 22 are spaced from the inner edge of the annular bearing plate.

Alternatively, as shown in the modified embodiment of FIG. 5, the inner edge of the annular bearing plate 11 is in contact with the ribs 22 which further increases the width of the annular bearing plate 11 at this location and fixes the bearing plate 11 against rotation with the operating member 10.

To center the annular bearing plate 11 against the radial forces exerted by the throw-out fork, there are also provided in the FIG. 5 embodiment two bosses 43 projecting axially from the annular flange 20 of the operating member 10, diametrically opposite each other as shown, and alternating with the ribs 22, the bosses 43 coming into contact with the inner edge of the annular bearing plate 11.

In the alternative embodiment of FIG. 6 planar sides 44 are provided on bosses 43 for cooperation with the inner edge of the annular bearing plate 11. Inner edge portions of the annular bearing plate are rectilinear in line with the planar sides or faces 44 to improve the centering of the annular bearing plate 11 as well as its securement against rotation.

A slight amount of play, not visible in FIG. 6, is provided between the annular bearing plate 10 and the bosses 43 as well as between the annular bearing plate 11 and the ribs 22 for facilitating the mounting of the annular bearing plate 11.

It will also be noted that the width of the annular bearing plate 11 in line with the bosses 43 is increased. According to a feature of the invention advantage is taken of this arrangement for providing in line with the bosses 43 planar bearing portions 30 which are similar to those in line with ribs 22 and at right angles thereto. Preferably, the length of the planar sides 44 on bosses 43 is equal to that of the planar sides 23 on ribs 22.

Thus, with alternating bearing portions 30 and resilient portions 31, the annular bearing plate 11 is advantageously circularly symmetrical. The annular plate 11 may then be brought into position in any of four different angular orientations in the FIG. 6 embodiment.

FIG. 7 illustrates the application of the invention to a pull-type clutch release bearing. In such a clutch release bearing the inner race 26 of the ball bearing which the drive member 12 comprises, is sufficiently axially elongate to be received in the center opening defined by the free ends of the release members 16.

Since the release members 16 are preferably part of a diaphragm spring, the ends of the fingers are resiliently clamped between a support washer 45 and a cup spring 48. The support washer 45 is disposed axially beyond the fingers with respect to the flange 20 of the operating member 10 and bears (preferably through a rounded annular bead formed by stamping) axially against the face of the fingers remote from the flange 20 and in axial abutment against a snap ring 46, e.g., a split spring washer, disposed in a groove 47 in the outer wall of the inner race 26 of the ball bearing. The cup spring 48 bears on the other side of the fingers 16, facing the flange 20 of the operating member 10, and is, for example, a Belleville washer. The cup spring 48 in turn bears axially through a backup washer 49 against a shoulder 50 formed on the outer wall of the inner race 26 of the ball bearing. This arrangement is well known in the art and need not be described in greater detail herein.

For the operation of the actuating member of which only one prong or arm 17 of the throw-out fork is schematically represented in chain-dotted lines in FIG. 7, the annular bearing plate 11 is disposed in contact with end of the outer race 27 of the drive member ball bearing which faces away from the annular flange 20 of the operating member 10.

Thus, in this embodiment, indirectly through the outer race 27 of the ball bearing, the annular bearing plate 11 bears axially against the operating member 10 and more particularly against the annular flange 20 thereof.

In any event, in this embodiment, the annular bearing plate 11 includes the axially acting resilient means. The axially acting resilient means alternates with the bearing portions 30 cooperable with the actuating member and comprises resilient portions 31, e.g., corrugations, by which the corresponding coupling means are joined. In the FIG. 7 embodiment the attachment means comprises axial tabs 36 in one-piece with the annular bearing plate 11 and lugs or hooks 40 in one-piece with the annular flange 20 of the operating member 10.

In addition, in the FIG. 7 embodiment the annular flange 20 has, at spaced locations along its edge between the lugs or hooks 40, axial projections 55 for guiding the throw-out fork and securing the clutch release bearing against rotation. Such axial projections 55 preferably have a flat 56 facing radially inwardly toward the prong or arm 17 of the associated throw-out fork. It is also of advantage to utilize the axial projections 55 for insuring or improving the securement of the annular bearing plate 11 against rotation, and to this end, portions of the outer edge of the bearing plate 11 facing the axial projections are rectilinear. Preferably, four such axial projections 55 are provided which circumferentially alternate with the lugs of hooks 40.

In any event, the ribs, bosses or projections on the operating member 10 facilitate the mounting of the annular bearing plate. Indeed, such ribs, bosses or projections, in effect, pre-center the annular bearing plate during mounting.

The present clutch release bearing is not intended to be limited to the illustrated and described embodiments but on the contrary covers all alternatives and modifications understood to those skilled in the art without departing from the spirit and scope of the invention.

In particular, taking the embodiments of FIGS. 1–6, wherein the axial tabs constitute part of the attachment means for securement to the operating member instead of being in one-piece with the annular bearing plate may as a variant be in one-piece with the associated cap, or even form separate components such as the annular bearing plate and cap disclosed in U.S. Ser. No. 283,300, now abandoned, assigned to the assignee of the present application and incorporated by reference herein.

Whenever for engagement with the axial tabs the cap comprises lugs or hooks, the latter instead of being formed on an annular rim may be formed directly on the edge of the radial or transverse wall thereof; the cap need not comprise such an annular rim.

Further, the annular rim of the cap may be in play free relation with the corresponding race of the ball bearing of the drive member. In this case the radial wall of the cap may be utilized to form a grease cap for the ball bearing. Of course, in such a case steps are taken to maintain self-centering, for example, the length of the axial tabs of the attachment means is determined in consequence.

Finally, instead of the resilient portions of the annular bearing plate being defined by local deformations such as corrugations or undulations they may comprise tongues struck from and integral with the annular bearing plate. The free end of each such resilient tongue being axially spaced from the bearing portions of the annular bearing plate such as disclosed in U.S. Pat. No. 4,144,957 assigned to the assignee of the present application and incorporated herein by reference.

What is claimed is:

1. A self-centering clutch release bearing for sustained alignment for use with an automotive clutch, said clutch release bearing comprising an operating member, an annular bearing plate effectively bearing axially against the operating member for cooperation with an actuating member, a drive member adapted to coact with clutch release members, said drive member being mounted for limited transverse movement relative to said operating member, axial tabs joined to said annular bearing plate for securing said drive member axially to said operating member under the bias of axially acting resilient means, said axially acting resilient means being an integral part of said annular bearing plate, said annular bearing plate comprising at least one substantially planar bearing portion and said axially acting resilient means comprising at least one resilient portion of said annular bearing plate circumferentially spaced from said bearing portion.

2. The clutch release bearing of claim 1, wherein said axial tabs are joined to said annular bearing plate by respective resilient portions.

3. The clutch release bearing of claim 1, wherein said annular bearing plate comprises at least two bearing portions, said resilient portions alternating with said bearing portions.

4. The clutch release bearing of claim 1, wherein said annular bearing plate comprises more than two resilient portions and more than two circumferentially spaced bearing portions.

5. The clutch release bearing of claim 1, wherein said resilient portion comprises a local deformation axially offset from the bearing portion of said annular bearing plate.

6. The clutch release bearing of claim 5, wherein said deformation is of circumferentially elongate corrugated configuration.

7. The clutch release bearing of claim 6, wherein said deformation extends radially across the entire width of said annular bearing plate.

8. The clutch release bearing according to claim 1, wherein the radial dimension of said bearing portion is greater than that of the rest of the annular bearing plate.

9. The clutch release bearing of claim 3, said operating member including a transverse flange extending radially outwardly from a sleeve, said annular bearing plate bearing against said transverse flange, the side of said substantially planar bearing portions facing said transverse flange being in contact with said transverse flange, and the side of each of said resilient portions facing said transverse flange being out of contact with said transverse flange.

* * * * *